United States Patent [19]

McDonald et al.

[11] Patent Number: 5,345,521
[45] Date of Patent: Sep. 6, 1994

[54] ARCHITECTURE FOR OPTICAL SWITCH

[75] Inventors: T. Gus McDonald; R. Mark Boysel, both of Plano, Tex.

[73] Assignee: Texas Instrument Incorporated, Dallas, Tex.

[21] Appl. No.: 90,862

[22] Filed: Jul. 12, 1993

[51] Int. Cl.⁵ ............................................. G02B 6/26
[52] U.S. Cl. ....................................... 385/19; 385/14; 385/17; 385/18; 385/20; 359/234; 359/855; 359/865
[58] Field of Search ........................ 385/16, 17, 18, 19, 385/20, 14, 25, 33, 40, 39; 359/198, 199, 212, 230, 234, 227, 213, 214, 221, 224, , 291, 846, 847, 848, 850, , 855, 865

[56] References Cited

U.S. PATENT DOCUMENTS

| | | | |
|---|---|---|---|
| 4,384,761 | 5/1983 | Brady et al. | 385/19 X |
| 4,580,873 | 4/1986 | Levinson | 385/17 |
| 4,932,745 | 1/1990 | Blonder | 385/18 |
| 5,107,533 | 4/1992 | Jaski | 385/18 |
| 5,155,778 | 10/1992 | Magel et al. | 385/18 |
| 5,178,728 | 1/1993 | Boysel et al. | 156/656 |
| 5,212,582 | 4/1993 | Nelson | 359/224 |
| 5,226,099 | 7/1993 | Muignardi et al. | 385/19 |
| 5,247,593 | 9/1993 | Lin et al. | 385/17 |

FOREIGN PATENT DOCUMENTS

| | | | |
|---|---|---|---|
| 57-0005006 | 1/1982 | Japan | 385/18 |
| 61-0132918 | 6/1986 | Japan | 385/18 |
| 2224129A | 4/1990 | United Kingdom | 385/17 |

Primary Examiner—Frank Gonzalez
Attorney, Agent, or Firm—Julie L. Reed; James C. Kesterson; Richard L. Donaldson

[57] ABSTRACT

An optical switching device with switch elements (224) similar to digital micromirror devices (DMD). The switching element (224) resides in a trench (216) between two elevated areas on the substrate (214a, 214b). Sending and receiving fibers (218a, 218b) face each other across the trench (216) with the switch element (224) between them. When the switch is ON, light travels through lenses (220a, 220b) in the trench (216) from one fiber (218b) to the other (218a). When the switch is flipped OFF, the element (224) is activated and blocks the light from the sending fiber (218b) by reflecting or absorbing the light from the sending fiber (218b). The switch is activated and possibly deactivated by addressing electrodes (226a, 226b) under the element (224), which deflects through an air gap towards the activated electrode (226b). For better deflection angles the posts can be arranged closer to one end of the element than the other. An alternate hinge architecture is also provided.

8 Claims, 2 Drawing Sheets

ARCHITECTURE FOR OPTICAL SWITCH

BACKGROUND OF THE INVENTION

1. Field of the Invention

This invention relates to optical switching, more particularly to electromechanical optical switching.

2. Background of the Invention

Optical switches are typically of two types: ON/OFF and routing. Routing switches such as those shown in U.S. Pat. Nos. 5,155,778 and 5,846,863, can connect an input to any one of several outputs. ON/OFF switches, such as those shown in U.S. Pat. Nos. 5,178,728 and 5,846,863, make or break the optical connection between a single input and a single output. Although routing switches are more optically efficient, because all available light is put to use, they are more difficult to manufacture and align optically than ON/OFF switches. One structure that is particularly adaptable to both uses is the digital micromirror device (DMD), because of its fast switching time and relative ease of manufacture.

ON/OFF switches fall into two further categories. Shutter switches block and unblock the optical path between the input and output. This blocking can be performed in many ways. The two most common are altering the transmission characteristics of the optical medium between input and output. Steering switches steer light from the input fiber into or out of the output fiber. These switches, like routing switches, are more difficult to manufacture: and align optically than shutter switches.

Typically, the shutter switches have far less loss than the steering switches. They normally operate with the DMD element, a highly reflective, individually addressable micromirror, being inserted or brought into proximity of the fibers to turn the switch OFF. When the switch must pass light, the metal element remains away from the fiber and the light travels with relatively low loss. Additionally, since the switch operates within the fiber, there is no alignment problems, which can also lead to loss.

The steering switches typically only pass light from fiber to fiber if the DMD is ON. In one arrangement, the optical system is configured with the input and output fibers mounted at an angle to each other. The DMD is arranged at the intersection of the optical paths of the sending and receiving fiber, and light is bounced off of an ON DMD and to the receiving fiber. Another arrangement consists of a DMD arranged "over" the two fibers, so the light must be reflected out of the plane of the fibers and bounced off of an ON DMD element back to the plane of the receiving fiber. This contributes to loss, both from misalignment, which becomes a far greater possibility in this architecture, and the reflection loss from the mirror. The angling of the fibers and the package has other disadvantages as well, especially the difficulty in manufacturing, due to alignment problems, and the resultant bulky package.

Therefore, a need exists for an ON/OFF shutter switch between fibers that has the same advantages as other shutter switches such as ease of collinear alignment, less loss, and manufacturability.

SUMMARY OF THE INVENTION

Disclosed herein is an optical switch architecture that allows sending and receiving fibers to remain collinear and has low loss, including a structure that enables the switch architecture. The switch comprises a pair of fibers mounted to a substrate, with lenses for transmitting the light across a gap, at the bottom of which resides a spatial light modulator (SLM) element, typically of the reflective type. When the switch is OFF, the element is activated and it blocks the entire cross-section of the beam of light from the sending fiber, so no light is received at the other fiber. When the switch is ON, the element remains completely removed from the optical path, thereby not contributing to any loss.

It is an advantage of this invention that fibers can be coupled with no reflection loss.

It is an advantage of this invention that the alignment of the fibers is more easily accomplished with the fibers remaining collinear.

It is an advantage that the switch packages are smaller and more streamlined.

It is an advantage that the switch packages are easier to manufacture.

BRIEF DESCRIPTION OF THE DRAWINGS

For a complete understanding of the invention, and the advantages thereof, reference is now made to the following description in conjunction with the accompanying drawings, in which.

DETAILED DESCRIPTION OF THE PREFERRED EMBODIMENT

Figure 1A:
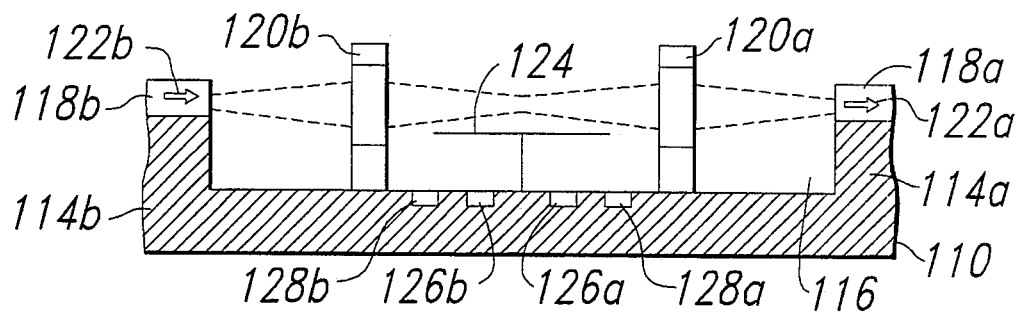
FIGS. 1a–1c show an optical switch using a standard-architecture, reflective spatial light modulator (SLM) element.

An optical switch using a standard architecture spatial light modulator (SLM), in this case a digital micromirror device (DMD), is shown in FIG. 1. The substrate 110 has a trench or depression 116 etched or sawn into it. Additionally, the two shelves 114a and 114b could be grown or deposited on the sides of a defined area which will become the gap 116. On top of the shelves 114a and 114b, fibers or waveguides 118a and 118b are mounted on the substrate by one of several techniques. The fibers could be bonded, inserted in grooves or deposited onto the shelves, to give a few examples of these methods.

Between the fibers and the actual switch point are lenses 120a and 120b to assist in the transmission of the light from the sending fiber to the receiving fiber. The light travels through fiber 118b in the direction of the arrow 122b. The light passes from fiber 118b, through lens 120b, over the switching element 124, through lens 120a and into fiber 118a. The lenses can be mounted on the surface of the trench in the wafer or placed in premade slots, typically after the manufacture of the switching element 124.

Switching element 124 has two pairs of electrodes underneath it. One electrode on each side, 126a or 126b, is an addressing electrode. When a voltage is placed upon one of these electrodes, the electrostatic force between the activated electrode and the element deflects the element 124 towards that electrode. The element 124 then lands on landing electrode 128a or 128b, which is held at the same electrostatic potential as the element.

The element is manufactured as follows. The substrate 110 has the trench made into it or on it. The substrate material, typically silicon, has CMOS addressing circuitry placed on it, or diffused into it. A protective dielectric layer is deposited and contacts are etched in it. Next, a metal layer is deposited and etched to form the electrode pairs, 126a–b and 128a–b, as shown in FIG. 1a. These electrode pairs are connected electrically to the underlying CMOS through the contacts in the dielectric. Alternatively, the circuitry can be off-chip and bonded to metal leads connected to the electrodes. The circuitry is then coated with a thick layer of polymer, such as photoresist, which is then hardened. Vias are formed in the polymer, either photolithographically prior to hardening, or by etching after hardening.

As an example, the process used to fabricate the element, the buried hinge process used to fabricate display DMDs, will be discussed. A thin layer of hinge metal is deposited on top of the polymer and into the vias. Next, a layer of plasma oxide is deposited and etched to form a hinge etch mask, but the hinge aluminum is not yet etched. A second thicker layer of mirror or element metal is then deposited over the hinge metal and oxide hinge etch masks, further coating the vias. The metal stack is then patterned and etched resulting in elements and support posts connected by thin hinge metal in the areas still masked by oxide. Finally a plasma etch is used to remove the oxide hinge mask and polymer spacer, resulting in a mirror suspended over an air gap by hinges attached to the posts. In switching applications, it is not necessary that the element actually be a mirror, or reflective surface. For example, it could also be an absorbing surface.

Figure 1B:
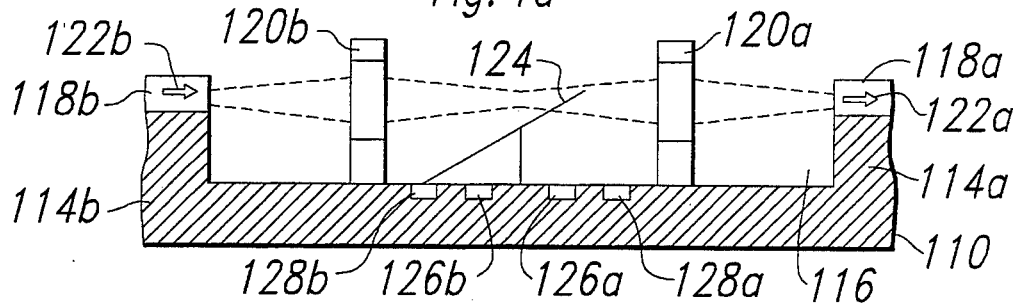

In FIG. 1b, a DMD architecture that has the mirror suspended from two opposite corners of the element is used to switch the light. The light enters fiber 118b in the direction of arrow 122b, travels through lens 120b and encounters the tilted end of the element 124. The element 124 tills because addressing electrode 126b has received an address voltage, which causes the electrostatic attraction to build and draw the element towards the electrode, landing on electrode 128b When the switch is ON (allowing light to pass), the element is reset to its undeflected state. This is accomplished by either sending a voltage pulse to the element, causing it to vibrate and free itself, or by addressing the opposite electrode.

Figure 1C:
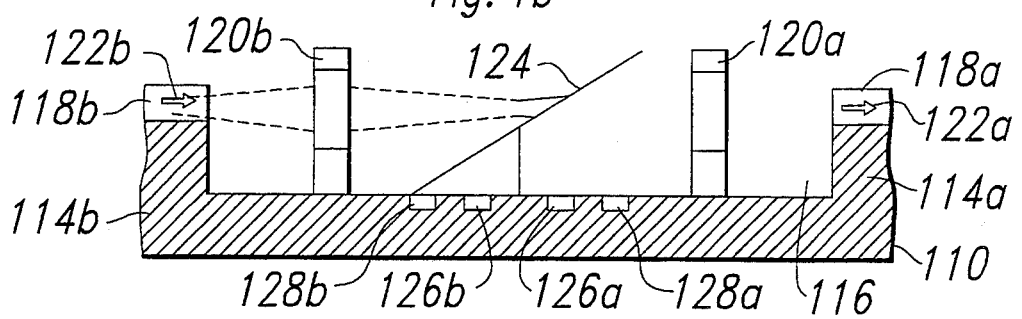

As can be seen by the position of the tilted element 124 and the light path, shown by arrow 122a, the amount of light passed to the receiving fiber 118a is less. Because of the constraints of the element results in it essentially being blocked by the substrate, the element cannot tilt far enough to be completely OFF, using the standard size DMD. As can be seen in FIG. 1c, a larger DMD element can switch OFF all of the light. The standard size element DMD can be used, if it is elevated higher over the substrate and the electrodes formed closer to the posts, allowing a greater deflection. This could be accomplished by using thicker spacer in the manufacturing process discussed above.

Figure 2A:
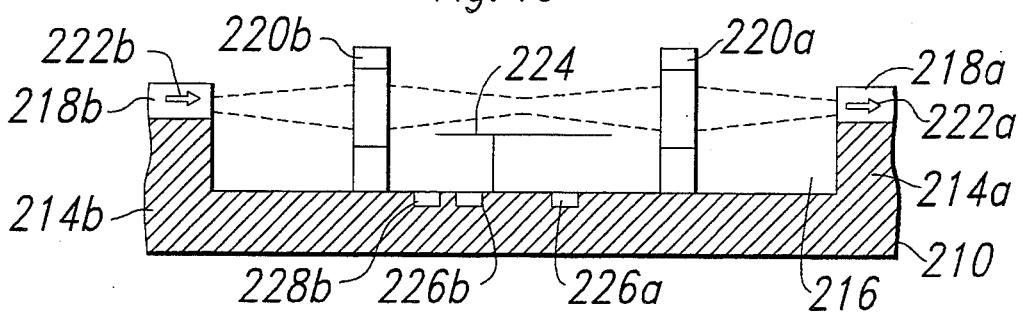
FIGS. 2a–2b show an optical switch using an asymmetric element.
Figure 2B:
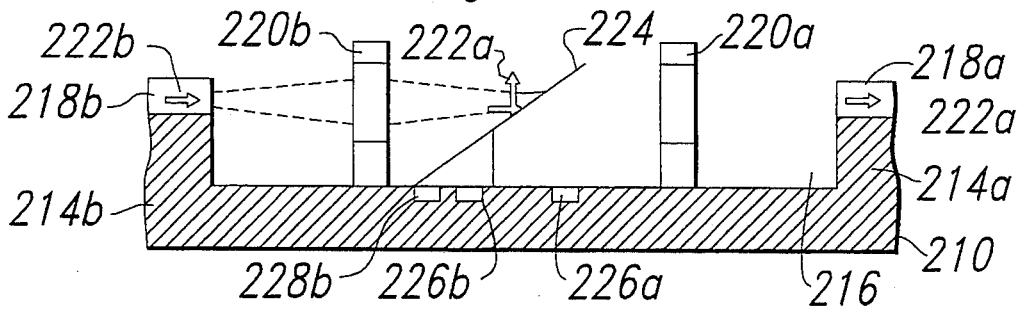

Another solution for this is to use an asymmetric DMD, as shown in FIG. 2a. The posts and hinges are offset to one end of the element, rather than being opposite each other at the midpoint of the side. As can be seen if FIG. 2a, this possibly eliminates the need for a landing electrode underneath the longer side of the element, since it is unlikely that deflecting the mirror the other way would be desirable. In FIG. 2b, the arrows again show the passage of light, but this time the long side of element 124 completely blocks the light from the receiving fiber 118a. the light travels in the direction of arrow 122a, and is kept completely away from the receiving fiber 118a, eliminating any noise in the switch.

While the light is shown travelling from fiber 118b to fiber 118a, the switch could be configured for light travel the other way as well, striking the underside of element 124. However, this may not be desirable because the light will reflect off of the underside of the element and be directed into the substrate. If there is an address electrode for reset of the element, the light may cause photocarriers and leakage in the electrode, especially if it is a DRAM cell. This would only be for a short time, when the electrode is active, since that is the only time that there would be any signal to leak from the address electrode 126a. Additionally, this problem could be avoided by using an SRAM cell, an absorbing surface on the underside of the mirror, or not using a reset electrode, as mentioned above.

The larger size elements, symmetrical or asymmetrical, may experience structural problems such as curling due to built-in film stresses. The element may need reinforcement to overcome this problem. One possible solution is to corrugate the surface of the element. Since it does not have to act as a reflective surface for imaging, the non-planar surface would not affect the functionality of the switch.

Figure 3A:
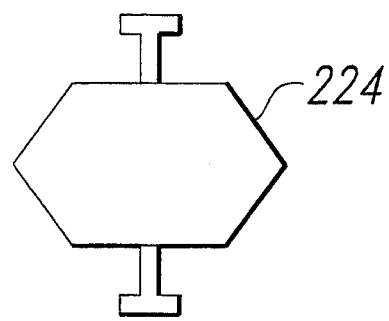
FIGS. 3a–3d show alternate hinge arrangements for a DMD element.
Figure 3B:
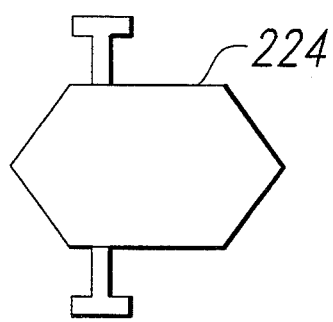
Figure 3C:
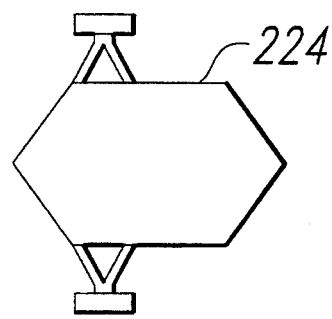

The reset may also have detrimental effects on large elements. The twisting back and forth from undeflected to deflected states could put too much strain on the hinges and break them. One possible way to overcome this is to change the architecture of the hinges to the "Y" hinge shown in a top view in FIG. 3c. The standard architecture DMD and the asymmetric DMD are shown if FIG. 3a and 3b for comparison The Y hinge has more strength for such motions as twisting, while not adversely affecting the ability to twist, which would limit the deflection of the element. It is the ability to deflect fully which allows the asymmetric element to completely block the light from the receiving fiber. These surfaces can be reinforced with corrugations, as discussed previously.

Figure 3D:
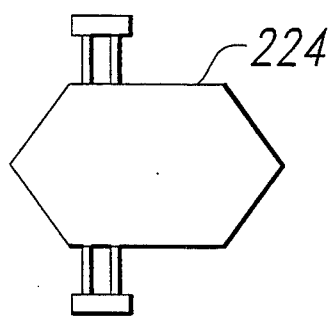

Also, shown in FIG. 3d is a multiple parallel hinge DMD. The element is supported by two hinges on either side rather than one. This is applicable to the asymmetric as well as the symmetric DMD switch. There is some effect on the tilting ability of the element due to the higher mechanical resistance of the second hinge. However, the element can be deflected far enough to switch OFF the light completely.

Figure 4:
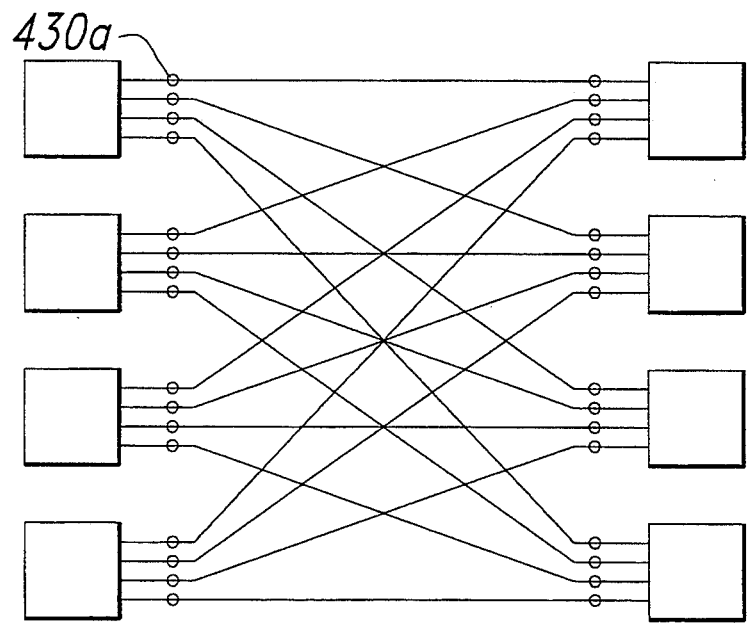
FIG. 4 shows a crossbar switch with the switching points for a 4×4 switch.

The individual switching elements could be repeated along a linear array, giving a crossbar switch as shown in FIG. 4. Each dot, as shown by 430a represents a switching element. The fibers are kept co! linear on either side of the switch point, and then can be routed in any desired manner. In this way, two linear arrays of 16 elements each complete a 4×4 crossbar switch.

This architecture of the asymmetric DMD allows collinear, easily aligned fibers to switch light quickly and with low insertion losses. The small size of the arrays result in small, relatively flat packages for optical switches.

Thus, although there has been described to this point a particular embodiment for an asymmetric DMD optical switch, it is not intended that such specific references be considered as limitations upon the scope of this invention except in-so-far as set forth in the following claims.

What is claimed is:

1. An optical switching device, comprising:
   a. a substrate;
   b. at least one switching element, each said element comprising:
      i. at least one addressing electrode on said substrate;
      ii. at least one support post adjacent said at least one addressing electrode, wherein each said support post has a hinge;
      iii. at least one landing electrode, said landing electrodes arranged adjacent said at least one addressing electrode on the opposite side of said addressing electrode from said at least one support post;
      iv. a movable member suspended from said hinge attached to said at least one support post, such that when said addressing electrode is activate, said movable member moves towards said addressing electrode and a portion of said movable member comes into contact with said landing electrode;
   c. elevated areas on said substrate on either side of said switching element;
   d. at least one sending fiber and at least one receiving fiber, wherein each said sending fibers are arrange collinear and opposite each said receiving fiber on said elevated areas on opposite sides of such switching elements, wherein when said switching element is activated, the non-deflecting side of said switching element blocks transmission of light from said sending fiber to said receiving fiber.

2. The device of claim 1 wherein said at least one addressing electrode further comprises two addressing electrodes, arranged on the substrate underneath opposite sides of said movable member.

3. The device of claim 1 wherein said at least one landing electrode further comprises two landing electrodes arranged on the substrate underneath opposite sides of movable member.

4. The device of claim 2 where said at least one landing electrode further comprises two landing electrodes arranged on the substrate underneath opposite sides of movable member, and said landing electrodes are farther from the center of said movable surface that said addressing electrodes.

5. The device of claim 1 wherein said at least one support posts further comprises two support posts arranged at the midpoint on opposite sides of said movable member.

6. The device of claim 1 wherein said at least one support posts further comprises two support posts arranged directly across from each other closer to one end of the movable member than the other.

7. The device of claim 6 wherein said hinge attached to each said support post is a Y hinge.

8. The device of claim 6 wherein said hinge attached to each said support post comprises multiple parallel hinges.

* * * * *